P. M. LINCOLN.
INSULATOR.
APPLICATION FILED JULY 13, 1914.

1,241,528.

Patented Oct. 2, 1917

WITNESSES:
Fred A. Lind
Geo. W. Hansen

INVENTOR
Paul M. Lincoln
BY
ATTORNEY

UNITED STATES PATENT OFFICE.

PAUL M. LINCOLN, OF PITTSBURGH, PENNSYLVANIA, ASSIGNOR TO WESTINGHOUSE ELECTRIC AND MANUFACTURING COMPANY, A CORPORATION OF PENNSYLVANIA.

INSULATOR.

1,241,528. Specification of Letters Patent. Patented Oct. 2, 1917.

Application filed July 13, 1914. Serial No. 850,681.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Insulators, of which the following is a specification.

My invention relates to insulating structures, and it has special reference to high-voltage insulators which are adapted for outdoor installation in which service they may be exposed to severe mechanical and electrical service conditions.

It is important that the service rendered by large electrical power systems be interrupted as infrequently as possible. To this end, it is highly desirable to support the high-voltage conductors upon reliable insulating structures which will insure continued service to the consumers connected to the power system. As it is practically impossible to provide insulators which will invariably resist the abnormal potential stresses imposed thereupon, it is advantageous to so construct the insulators that they may be conveniently and quickly replaced when broken down.

Because of the expense involved in scrapping a complete insulator which has certain defective portions, I provide an insulator built up in sections any one of which may be readily replaced when occasion demands.

Another object of my invention is to provide an insulator in which the exposed surfaces are made of some tough or resistant material that will resist mechanical impacts or strains imposed thereupon.

In my insulating structure, I may also incorporate the principles disclosed in patent application of Messrs. Randall, Farnsworth and Fortescue, Serial No. 558,744, filed April 30, 1910, and assigned to the Westinghouse Electric & Manufacturing Company, whereby the air may be utilized to its full insulating value. As disclosed in the aforementioned patent application, the exposed surfaces of the insulating bodies interposed between the conducting members of my insulator are of special configurations in order to conform to the lines of force which represent the existing electrostatic fields between the conducting members.

Figure 1:
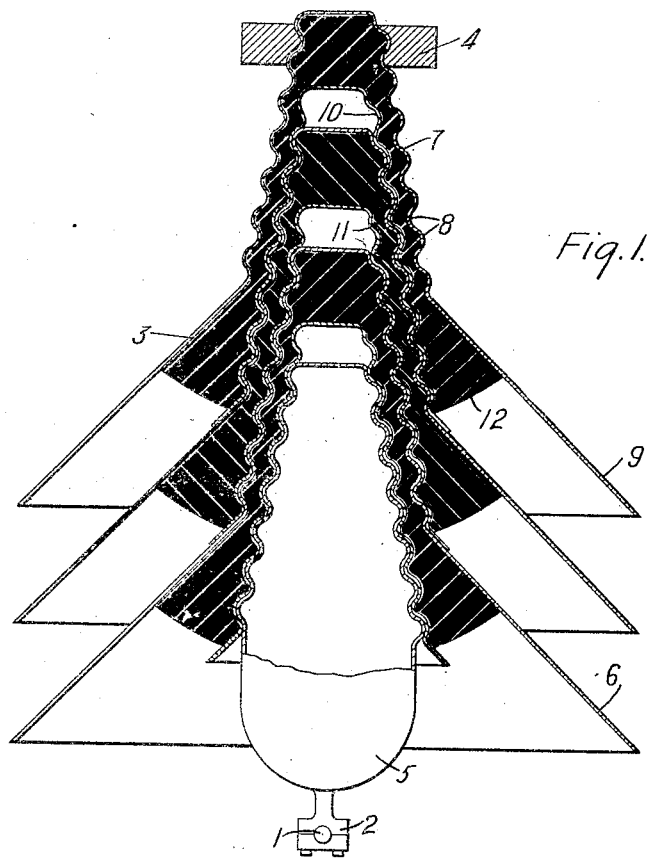
Figure 2:
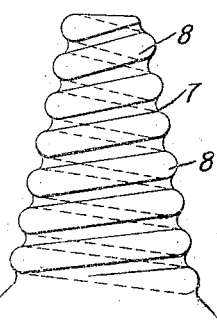

For a better understanding of the nature and scope of my invention, reference may be had to the following description and the accompanying drawing in which Figure 1 is a view, partially in elevation, and partially in section, of an insulator constructed in accordance with my invention, and Fig. 2 is a side view of a portion of one of the conducting members embodied in my insulator.

Referring to Fig. 1, a high-potential conductor 1 is connected, by means of a clamp 2, to an insulator 3 which is supported by a member 4. The member 4 may be secured to a pole or tower of any well known type of construction.

Instead of mounting the insulator 3 in the manner shown to make it of the suspension type, the conductor 1 may be secured near the top of the insulator, and the supporting means securing the insulator to the pole or tower may engage the lower portion of the insulator, thereby making it of the usual type.

The clamp 2 which engages the conductor 1 is secured to a metallic element 5 which is nested into a lower conducting member 6 of my insulator. Each of the members 6 comprises an upper tapered portion 7 which is provided with inner and outer corrugations 8 arranged helically to form screw threads and conically flared lower portions 9 which extend laterally beyond the upper portions 7. Inner metallic shells 10, which are preferably formed upon the same mold with the upper portions 7, are disposed within the upper portions 7 but spaced therefrom by insulating material 11. In building up the insulating structure, the inner shell 10 is properly placed within the member 6, and the insulating material 11 is interposed therebetween to hold the two metallic members in fixed relation to each other. Similarly, each member 6 is provided with the inner shell 10 and dielectric material 11.

Inasmuch as the shells 10 and the upper portions of the members 6 are spun upon the same mold, they are adapted to engage cooperatively with each other. This permits any one of the members 6 to be replaced, whenever the insulation 11 breaks down under potential stresses, without removing or replacing the entire structure 3.

For high-voltage service, it is desired that exposed surfaces 12 of the insulating material 11 be so shaped as to conform to the electrostatic flow lines existing between adjacent conducting members 6. As before mentioned, this permits the air to be utilized to its full insulating value, thereby greatly enhancing the effectiveness of my insulating structure. Inasmuch as the petticoats 9 extend beyond the insulating material 11, they receive all mechanical blows or shocks, and thereby insure the insulating material 11 against injury.

Of course, it is important to avoid all sharp edges and the formation of reëntrant angles upon the metallic members 6 in order to substantially preclude the occurrence of brush or corona discharges. The members 6, being formed of metal, therefore, readily lend themselves to be made in accordance with the above-mentioned principle.

Fig. 2 shows somewhat in detail the construction of the upper portions 7 of the conducting members 6. The screw threads 8 are of such a form that they readily permit members 6 to detachably engage the shells 10.

Although I have shown and described a device of specific structural details, many modifications may be effected therein within the spirit and scope of my invention, and I desire that only such limitations shall be imposed as are indicated in the appended claims.

I claim as my invention:

1. An insulating structure comprising a conducting member having an exteriorly threaded upper portion and a laterally extending petticoat portion, an interiorly threaded shell nested in said upper portion, and an insulating body interposed between the conducting member and said shell, the exposed surfaces of the insulating body being shaped to substantially conform to the electric flow-lines emanating from said conducting member.

2. An insulating structure comprising a conducting member having an upper portion provided with an exterior screw thread and a laterally extending lower portion, a shell inserted in the upper portion only of said conducting member, said shell being provided with an inner screw thread nested therein, and insulating material disposed between the conducting member and said shell.

3. An insulating structure comprising a conducting member having an exteriorly-threaded upper portion and a laterally-extending lower portion, and an insulating body contained in the conducting member which is provided with a recess having threaded walls that extend into the said upper portion of the conducting member, the exposed surfaces of the insulating body being shaped to substantially conform to the electric flow lines emanating from said conducting member.

4. An insulating structure comprising a plurality of nested and similar conducting members each having threaded upper portions and lower petticoat portions, an insulating body contained in each conducting member having a recess formed therein which is threaded to receive the threaded upper portion of the next succeeding conducting member, the exposed surfaces of the insulating bodies interposed between adjacent conducting members being shaped to substantially conform to the electric flow lines extending between adjacent conducting members.

5. An insulating structure comprising a conducting member having a threaded upper portion and a laterally extending lower portion, a shell nested therein, and insulating material interposed between the conducting member and said shell the exposed portions of which are shaped to substantially conform to the direction of the lines of force of the electric field existing between the adjacent conducting parts, the conducting members extending laterally beyond the insulating body.

6. An insulating structure comprising a plurality of superposed conducting members having threaded upper portions and laterally extending lower portions, a shell nested in each conducting member and threaded to receive the threaded upper portion of the next succeeding conducting member, and insulating material interposed between said shell and the inclosing conducting member, the conducting member extending laterally beyond the insulating material.

7. An insulating structure comprising a plurality of superposed conducting members having threaded upper portions and laterally extending lower portions, a shell nested in each conducting member and threaded to receive the threaded upper portion of the next succeeding conducting member, and insulating material interposed between said shell and the inclosing conducting member, the exposed portions of which are shaped to substantially conform to the direction of the lines of force of the electric field existing between the adjacent conducting parts, the conducting members extending laterally beyond the insulating bodies.

In testimony whereof, I have hereunto subscribed my name this 6th day of July 1914.

PAUL M. LINCOLN.

Witnesses:
A. L. HARVEY,
B. B. HINES.